United States Patent
Singh et al.

(10) Patent No.: US 10,459,701 B2
(45) Date of Patent: Oct. 29, 2019

(54) INTELLIGENT SOFTWARE COMPILER DEPENDENCY FULFILLMENT

(71) Applicant: Bank of America Corporation, Charlotte, NC (US)

(72) Inventors: Awadhesh Pratap Singh, Hyderabad (IN); Dinesh Narendra Jibhe, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/430,715

(22) Filed: Jun. 4, 2019

(65) Prior Publication Data
US 2019/0286428 A1 Sep. 19, 2019

Related U.S. Application Data

(63) Continuation of application No. 15/810,395, filed on Nov. 13, 2017, now Pat. No. 10,353,676.

(51) Int. Cl.
*G06F 8/41* (2018.01)
*G06N 20/00* (2019.01)
(Continued)

(52) U.S. Cl.
CPC ............ *G06F 8/41* (2013.01); *G06F 8/433* (2013.01); *G06N 20/00* (2019.01); *G06F 16/148* (2019.01); *G06F 16/951* (2019.01)

(58) Field of Classification Search
None
See application file for complete search history.

(56) References Cited

U.S. PATENT DOCUMENTS

| 5,634,114 A | 5/1997 | Shipley |
| 7,539,675 B2 | 5/2009 | Risberg et al. |

(Continued)

OTHER PUBLICATIONS

Ossher, J,. et al., Automated Dependency Resolution for Open Source Software, 7th IEEE Working Conference on Mining Software Repositories, 2010 pp. 130-140, http://ieeexplore.ieee.org/, Retrieved on Nov. 9, 2018.

(Continued)

*Primary Examiner* — Geoffrey R St Leger
(74) *Attorney, Agent, or Firm* — Weiss & Arons LLP; Michael A. Springs, Esq.

(57) ABSTRACT

A machine learning tool for resolving a compiler error in an application is provided. The application and an associated application metadata file may be stored on a server. The machine learning tool may identify one or more referenced external dependencies causing the compiler error. The machine learning tool may comprise a web crawler configured to locate one or more comparable external dependencies. The web crawler may retrieve an external dependent metadata file for each of the located comparable external dependencies and download the comparable external dependent metadata files. The machine learning tool may be configured to compare the metadata of each comparable external dependent metadata file to the metadata of the application metadata file, assign a confidence level relative to a pre-determined confidence level, for each located comparable external dependency, and download the located comparable external dependencies having a confidence level greater than the pre-determined confidence level.

18 Claims, 2 Drawing Sheets

(51) Int. Cl.
*G06F 16/14* (2019.01)
*G06F 16/951* (2019.01)

(56) References Cited

U.S. PATENT DOCUMENTS

| | | |
|---|---|---|
| 7,814,471 B2 | 10/2010 | Jodh |
| 7,865,874 B2 | 1/2011 | Wookey |
| 8,180,779 B2 | 5/2012 | Horowitz et al. |
| 8,473,574 B2 | 6/2013 | Kong et al. |
| 8,522,207 B1 | 8/2013 | Whittington et al. |
| 9,082,126 B2 | 7/2015 | Nielsen et al. |
| 9,760,349 B1 | 9/2017 | Chen et al. |
| 2002/0144248 A1 | 10/2002 | Forbes et al. |
| 2002/0199170 A1 | 12/2002 | Jameson |
| 2004/0123308 A1 | 6/2004 | Idoni |
| 2007/0169103 A1 | 7/2007 | Bhatkhande et al. |
| 2013/0311978 A1 | 11/2013 | Baumgart et al. |
| 2014/0173574 A1 | 6/2014 | Schmidt et al. |
| 2015/0249675 A1 | 9/2015 | Yeung et al. |
| 2016/0246575 A1 | 8/2016 | Baluch et al. |
| 2018/0217851 A1 | 8/2018 | Sirajuddin |

OTHER PUBLICATIONS

Atzenhofer, T., et al., "Automatically Adding Missing Libraries to Java Projects to Foster Better Results from Static Analysis," IEEE 17th International Working Conference on Source Code Analysis and Manipulation (SCAM), 2017, pp. 141-146, http://ieeexplore.ieee.org,/, Retrieved on Nov. 9, 2018.

Jezek, K., et al., Detecting Incompatibilities Concealed in Duplicated Software Libraries, 41st Euromicro Conference on Software Engineering and Advanced Applications, 2015, pp. 233-240, http://ieeexplore.ieee.org,/, Retrieved on Nov. 9, 2018.

Hoste, K., et al., EasyBuild: Building Software With Ease, SC Companion: High Performance Computing, Networking Storage and Analysis, 2012, pp. 572-582, http://ieeexplore.ieee.org,/, Retrieved on Nov. 9, 2018.

Jenson, G., Improving Component Dependency Resolution with Soft Constraints, Validation and Verification, IEEE/ACM International Conference on Automated Software Engineering, 2009, pp. 716-720, http://ieeexplore.ieee.org,/, Retrieved on Nov. 9, 2018.

Kalra, S., et al., Pollux: Safely Upgrading Dependent Application Libraries, Proceedings of the 2016 24th ACM SIGSOFT International Symposium on Foundations of Software Engineering, 2016, pp. 290-300, http://dl.acm.org/, Retrieved on Nov. 9, 2018.

INTELLIGENT SOFTWARE COMPILER DEPENDENCY FULFILLMENT

CROSS-REFERENCE TO RELATED APPLICATIONS

This application is a continuation of U.S. patent application Ser. No. 15/810,395, filed on Nov. 13, 2017, which is hereby incorporated by reference in its entirety.

FIELD OF TECHNOLOGY

Aspects of the invention relate to compiling an application. Specifically, aspects of the invention relate to compiling an application referencing dependencies.

BACKGROUND OF THE DISCLOSURE

Recently entities have been using cloud computing to remotely store data in a secure and low-cost environment. Cloud computing is also being used for storing applications. When developers create code for an application, the code generally includes referencing dependencies such as internal classes of data and external software libraries. The referenced dependencies may be imported to the server.

The application and the internal classes are stored on the server and are in synchronization with the cloud. The external software libraries may be retrieved in their entirety and stored on the server as well.

Storing the external dependencies on the cloud can create numerous challenges. For example, from the time the external dependency was retrieved and stored on the cloud until the time the application is compiled, the external dependencies may change as they are generally revised and updated.

In such instances, the application may not include the updated version. The application may, however, reference the updated version. Additionally, when copying the external dependency to the server and then from the server to a local computer, file names may be inaccurate. To ensure successful compilation, the process may be time consuming and tedious.

Therefore, it would be desirable to have systems and methods for compiling applications referencing dependencies.

SUMMARY OF THE DISCLOSURE

A system for compiling an application is provided. The system may comprise an application source code. The application source code may be stored on a centralized server. The application source code may be associated with the application. The application source code may reference a plurality of internal dependencies. The application source code may reference a plurality of external dependencies. The external dependencies may need to be retrieved from the internet. The internal dependencies and the external dependencies may need to be retrieved for compiling the application without errors. The internal dependencies may be stored in a cloud. The cloud may be in synchronization with the centralized server.

The system may further comprise an application metadata file. The metadata file may be stored on the centralized server. The metadata file may include metadata associated with each of the pluralities of external dependencies that may be referenced in the application source code.

The system may further comprise a machine learning tool. The machine learning tool may be configured to perform a plurality of steps. The steps may be for acquiring the external dependencies most comparable to the external dependencies referenced in the application source code. The tool may include a web-crawler. The web-crawler may be used to search the internet for external dependencies most suitable for the application.

Initially, the machine learning tool may identify the external dependencies referenced in the application. The tool may then instruct the web-crawler to locate a plurality of comparable external dependencies. The web-crawler may locate a plurality of comparable external dependencies for each of the referenced external dependencies. The external dependencies may include software libraries. The external dependencies may further include open-source software libraries, software objects and software classes. For example, the application source code may reference software library file extensions such as .dll file extension, .class file extension, and any other software library file extensions available. The web-crawler may locate a plurality of software library file extensions that may be the same or similar to the file extensions referenced in the application source code.

The comparable external dependencies that may be located by the web-crawler may be provided by external frameworks on the internet. The web-crawler may retrieve an external dependent metadata file for each of the plurality of located comparable external dependencies.

The metadata file of the referenced external dependencies and each metadata file for the located external dependencies may include but is not limited to, a file version, a file name and a file size. The web-crawler may pass the metadata files retrieved to the machine learning tool. The machine learning tool may compare the metadata of each comparable external dependent metadata file to the metadata of the application metadata file. The machine learning tool may compare the file name, file size and file version of the referenced external dependencies to the file name, file size and file version of the external dependent comparable metadata files. The machine learning tool may assign a confidence level, based on the comparison, for each comparable external dependency. The confidence level may be relative to a pre-determined confidence level.

The web-crawler may download the located comparable external dependencies for each referenced external dependency that may have a confidence level greater than the pre-determined confidence level.

The system may further comprise a compiler. The compiler may combine and compile the application source code with the internal dependencies and the downloaded external dependencies.

In certain embodiments there may be a plurality of comparable external dependencies having a confidence level greater than the pre-determined confidence level. When there are a plurality of comparable external dependencies having a confidence level greater than the pre-determined confidence level, the machine learning tool may be further configured to prompt a user to select the comparable external dependency. When the user selects a comparable external dependencies from the plurality of comparable external dependencies having a confidence level greater than the pre-determined confidence level, the machine learning tool may assign the user-selected comparable external dependency a highest level of confidence. The machine learning tool may then store, in a database on the centralized server, the user-selected comparable external dependency and its associated external dependent metadata file. The web-crawler may then download the user-selected comparable external dependency for the application.

As a result of the storing of the user-selected dependency in the database, it may enable the machine learning tool to automatically retrieve the user-selected dependency when the user needs the application at a different time.

In another embodiment, a machine learning tool for resolving a compiler error in an application is provided. The machine learning tool may comprise an identifier tool. The identifier tool may be configured to identify one or more referenced external dependencies in an application. The application may be stored on a centralized server. The identifier tool may be further configured to determine, from the identified referenced external dependencies, the referenced external dependencies causing the compiler error. The machine learning tool may further comprise a retriever tool. The retriever tool may be configured to retrieve an application metadata file linked to the application. The application metadata file may include metadata associated with the referenced external dependencies.

The metadata file may be stored on the centralized server. The server may be in synchronization with a cloud.

The machine learning tool may further comprise a web crawler. The web-crawler may be configured to locate one or more comparable external dependencies. The located comparable external dependencies may be similar to the external dependencies causing the compiler error. The located comparable external dependencies may be provided by external frameworks on the internet.

The web-crawler may be further configured to retrieve an external dependent metadata file for each of the located comparable external dependencies. Each of the metadata files may include metadata associated with the located comparable external dependency. The web-crawler may be further configured to download the located comparable external dependent metadata files.

The machine learning tool may be further configured to compare the metadata of each located comparable external dependent metadata file to the metadata of the application metadata file. The metadata may include but is not limited to, a file version, a file size, and a download time.

The machine learning tool may assign a confidence level for each located comparable external dependency. The confidence level may be relative to a pre-determined confidence level. The assigning may be based on the comparison.

The machine learning tool may assign a greater confidence level to a one, of the one or more located comparable external dependencies having the shortest download time. The machine learning tool may assign a greater confidence level to a one, of the one or more additional comparable external dependencies having the smallest file size. The machine learning tool may assign a greater confidence level to one, of the one or more additional comparable external dependencies having the latest file version.

The web-crawler may download the located comparable external dependencies that may be assigned a confidence level greater than the pre-determined confidence level. The machine learning tool may store, in a database, the located comparable external dependencies having the confidence level greater than the pre-determined confidence level.

The machine learning tool may further store the application associated with the additional external dependencies on the database. The database may be located on the centralized server.

When there are a plurality of comparable external dependencies being assigned a confidence level greater than the pre-determined confidence level, the machine learning tool may be further configured to select the comparable external dependency with the greatest confidence level.

The machine learning tool may further comprise a compiler tool. The compiler tool may be configured to combine and compile the application source code with the downloaded located comparable external dependencies, without errors.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
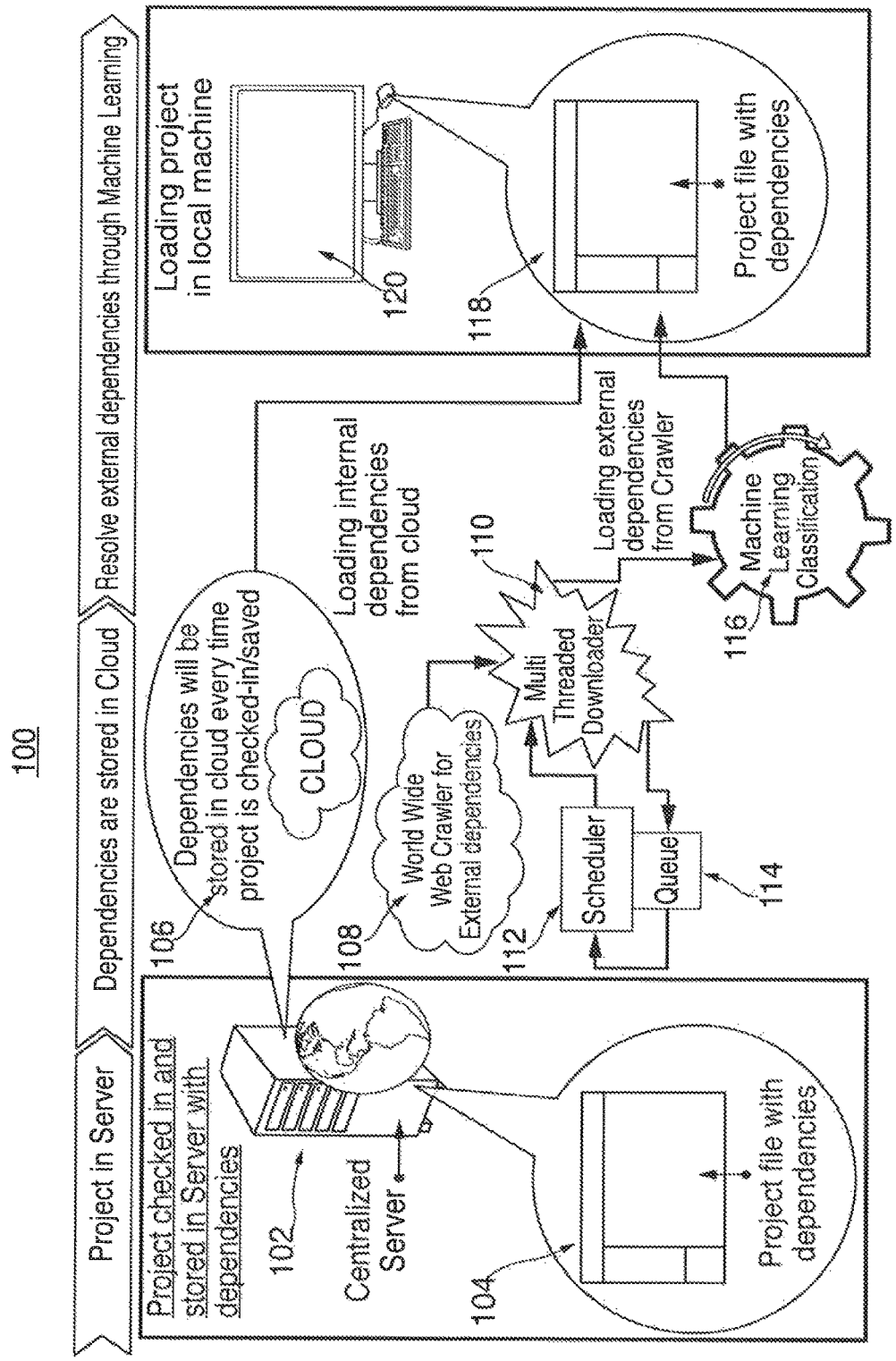
FIG. 1 shows an illustrative diagram in accordance with principles of the invention.

A method for compiling an application is provided. The method may include retrieving from a centralized server an application source code associated with the application. The application source code may reference a plurality of internal dependencies. The internal dependencies may be stored in a cloud. The cloud may be in synchronization with the centralized server. The application source code may reference a plurality of external dependencies. The external dependencies may be retrieved from the internet. The internal and external dependencies may be for successfully compiling the application.

The method may further include retrieving an application metadata file from the centralized server. The application metadata file may include metadata associated with each of the pluralities of external dependencies.

The method may further include performing a plurality of machine learning steps using a machine learning tool. The machine learning tool may include a web-crawler. The steps performed may be to determine the most appropriate external dependencies to be downloaded for the application. The machine learning tool may identify the external dependencies referenced in the application. The web-crawler may be configured to locate a plurality of comparable external dependencies for each of the referenced external dependencies. The comparable external dependencies may be provided by external frameworks on the internet.

The method may also include retrieving an external dependent metadata file for each of the plurality of located comparable external dependencies. The metadata file may include metadata associated with the comparable external dependency. The method may further include comparing the metadata of each comparable external dependent metadata file to the metadata of the application metadata file.

The method may further include assigning, based on the comparison, a confidence level for each comparable external dependency. The confidence level may be relative to a pre-determined confidence level.

The method may further include downloading the located comparable external dependencies for each referenced external dependency having a confidence level greater than the pre-determined confidence level. The method may further include combining and compiling the application source code with the internal dependencies and the downloaded external dependencies, without errors.

When there are a plurality of comparable external dependencies being assigned a confidence level greater than the pre-determined confidence level, the machine learning tool may be further configured to prompt a user to select a comparable external dependency from the plurality of comparable external dependencies that may have a confidence level greater than the pre-determined confidence level.

The machine learning tool may assign the user-selected comparable external dependency a highest level of confidence. The machine learning tool may further download the user-selected comparable external dependency.

The machine learning tool may further store, in a database on the centralized server, the user-selected comparable external dependency and its associated external dependent metadata file. The storing of the user-selected dependency may enable automatic resolving of dependencies for the application, when the user accesses it at a later time.

When the application source code for an application is being compiled again for the user at a later time, the method may further include automatically retrieving the stored user-selected comparable external dependency.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram 100 for resolving external dependencies using a machine learning tool.

Project file 104 (referred to in the alternative herein as "application source code") may be stored on a centralized server 102. Project file 104 may reference dependencies.

The dependencies referenced may include both internal dependencies and external dependencies. The internal dependencies may be stored in a cloud 106. Centralized server 102 may be in synchronization with the cloud 106. Internal dependencies may be modified at different times and the synchronization between the cloud and the server may enable the internal dependencies to be automatically updated.

Project file 104 may be downloaded from the server 102, by a user, and loaded onto the local machine 120. The project file on the local machine is shown at 118.

In preparation for compiling the project file 118, the internal dependencies and external dependencies may need to be downloaded. The internal dependencies referenced in project file 118 may be retrieved from the cloud 106 as shown at 122 and the user may be ensured that the most updated version is being accessed.

The external dependencies may not be stored on the cloud or on the server. They may be referenced in the application and only retrieved and downloaded at the time of compilation. This method may enable the application to include the most accurate and useful external dependency. It may further enable the external dependency with the latest version to be downloaded.

Retrieving and downloading the located comparable external dependencies at the time of compilation may prevent the need for the external dependencies to be at first copied to the server and then copied and transferred to the local machine.

External dependencies may be downloaded from the internet and there may be a plurality of versions related to the external dependency. Machine learning classification tool 116 may be a machine learning tool for determining the external dependencies for the project file 118 on local machine 120. Machine learning classification tool 116 may use a classification algorithm for determining the external dependencies. Machine learning classification tool 116 may use a world-wide-web crawler 108 to search the internet for external dependencies that may be referenced in project file 118. World-wide-web crawler 108 may retrieve one or more external dependencies that may be comparable to the external dependencies referenced in project file 118. Classification tool 116 may compare metadata associated with the external dependencies selected on the web to the metadata of the external dependencies referenced in the project file 118. Machine learning classification tool 116 may classify the external dependencies based on the comparison of the metadata files.

Machine learning classification tool 116 may then select the retrieved external dependency most compatible with the referenced external dependency. Classification tool 116 may select the external dependency from the internet that is the latest version.

Classification tool 116 may select the external dependency from the internet that has the shortest download time. Classification tool 116 may select the external dependency from the internet that has the smallest file size. Classification tool 116 may select the external dependency according to any suitable criteria.

World-wide-web crawler 108 may use a multi threaded downloader 110 for downloading the comparable external dependency. It should be appreciated that multi threaded downloader 110 can download multiple dependencies. Multi threaded downloader 110 may pull each comparable external dependency that may have been selected by the world-wide-web crawler and place it in a queue 114. Multi threaded downloader 110 may use a schedule 112 to schedule the time to download each external dependency on the queue 14. The metadata files for each comparable external dependency may be downloaded and the dependency associated with it may remain on the queue until the machine learning tool 116 may determine the most comparable external dependency.

Figure 2:
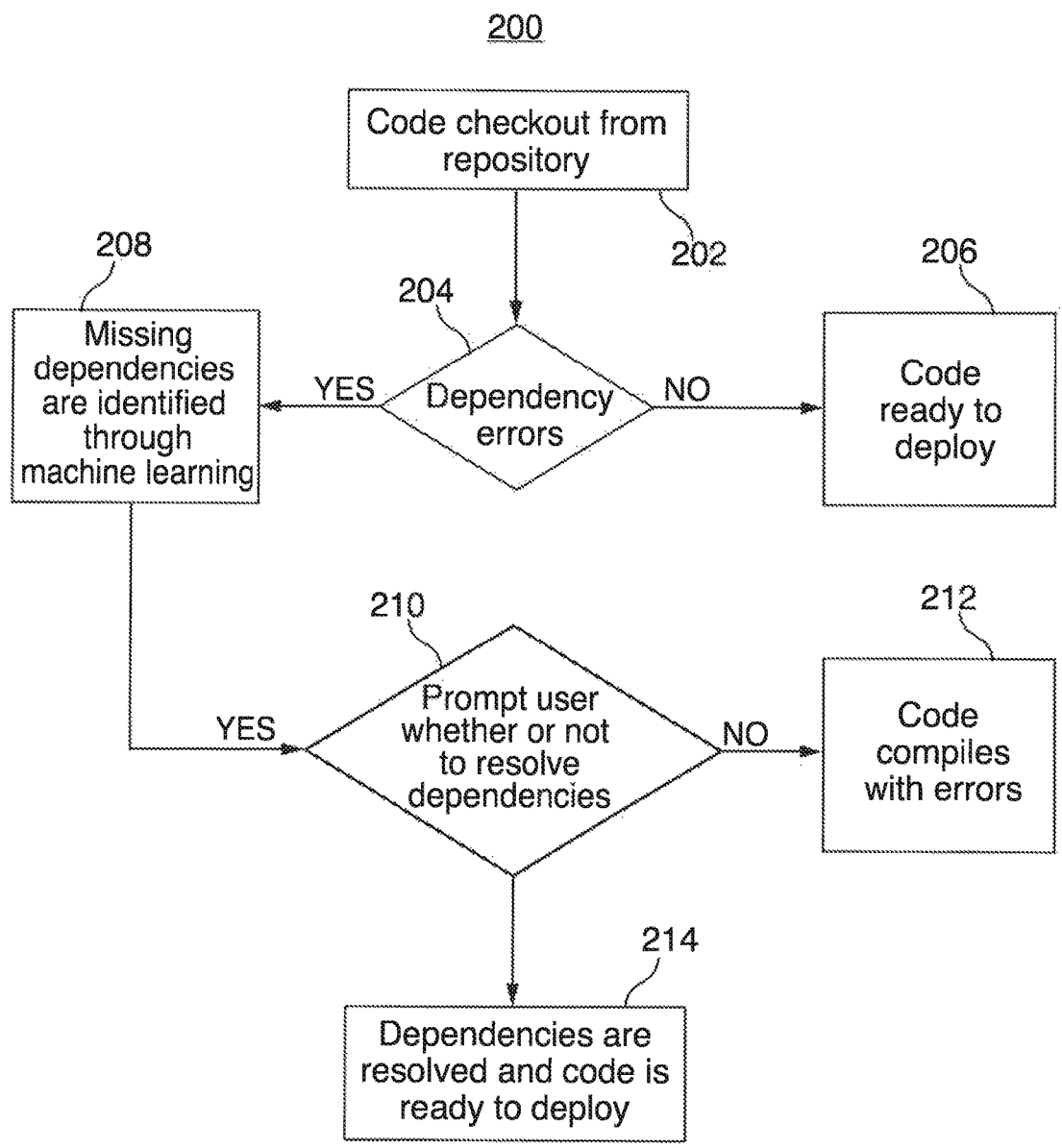
FIG. 2 shows an illustrative flow chart in accordance with principles of the invention.

FIG. 2 shows an illustrative flow chart 200 of an exemplary process for compiling an application using the system. The illustrative process 200 may include one or more of steps 202-214.

Application source code may be stored in a repository and may be retrieved from the repository at step 202 for compiling. If the code is determined to be code that will compile without errors then the code is ready to compile and be deployed as shown at step 206. It may be determined, at step 204, that the code will compile with dependency errors. Step 208 may show the missing dependencies being identified by the machine learning tool. When the missing dependencies are identified, the system may prompt the user whether or not to resolve the missing dependencies, as shown at step 210. In the event that the user does not want to resolve the errors, the code will compile with errors as shown at step 212. Otherwise, the user may request the dependency errors to be resolved and the machine learning tool may resolve the errors. The dependencies may then be resolved and the code may further be ready to compile and deploy, as shown at step 214.

Thus, methods and apparatus for compiling applications referencing dependencies have been provided. Persons skilled in the art will appreciate that the present invention can be practiced by other than the described embodiments, which are presented for purposes of illustration rather than of limitation. The present invention is limited only by the claims that follow.

What is claimed is:

1. A method for compiling an application, the method comprising:
retrieving from a centralized server:
an application source code associated with the application, the application source code referencing:
a plurality of internal dependencies stored in a cloud, the cloud in synchronization with the centralized server; and
a plurality of external dependencies for compiling the application;
an application metadata file including metadata associated with each of the pluralities of external dependencies; and
performing a plurality of machine learning steps using a machine learning tool, the plurality of steps comprising:
identifying the external dependencies referenced in the application;
instructing a web-crawler, the web-crawler being a component of the machine learning tool, to:
locate a plurality of comparable external dependencies for each of the identified referenced external dependencies, the comparable external dependencies provided by external frameworks on the internet; and
retrieve an external dependent metadata file for each of the plurality of located comparable external dependencies, the external dependent metadata file including metadata associated with the comparable external dependencies;
comparing the metadata of each comparable external dependent metadata file to the metadata of the application metadata file;
assigning, based on the comparison, a confidence level for each comparable external dependency, the confidence level being relative to a pre-determined confidence level, the assigning further comprising, assigning a greater confidence level to one of the located comparable external dependencies having a shorter download time relative to the other located comparable external dependencies;
downloading the located comparable external dependencies for each referenced external dependency having a confidence level greater than the pre-determined confidence level; and
combining and compiling the application source code with the internal dependencies and the downloaded external dependencies.

2. The method of claim 1 wherein, for each referenced external B dependency in the application metadata file and for each of the external dependent metadata files, the metadata includes:
a file name;
a file size; and
a file version.

3. The method of claim 1 wherein the comparing of the B metadata further comprises, comparing a file name, file size and file version of the referenced external dependencies to a file name, file size and file version of the external dependent metadata files for determining the confidence level.

4. The method of claim 1 wherein, when there are a plurality of comparable external dependencies being assigned a confidence level greater than the pre-determined confidence level, the machine learning tool is further configured to:
prompt a user to select a comparable external dependency from the plurality of comparable external dependencies having a confidence level greater than the pre-determined confidence level;
assign the user-selected comparable external dependency a highest level of confidence;
store, in a database on the centralized server, the user-selected comparable external dependency and its associated external dependent metadata file; and
download the user-selected comparable external dependency.

5. The method of claim 1 wherein, when the application source code for an application is being compiled again for the user, the system further comprises automatically retrieving a stored user-selected comparable external dependency.

6. The method of claim 1 wherein, the application referenced external dependencies further include open-source software libraries, software objects and software classes.

7. A method for compiling an application, the method comprising:
retrieving from a centralized server:
an application source code associated with the application, the application source code referencing:
a plurality of internal dependencies stored in a cloud, the cloud in synchronization with the centralized server; and
a plurality of external dependencies for compiling the application;
an application metadata file including metadata associated with each of the pluralities of external dependencies; and
performing a plurality of machine learning steps using a machine learning tool, the plurality of steps comprising:
identifying the external dependencies referenced in the application;
instructing a web-crawler, the web-crawler being a component of the machine learning tool, to:
locate a plurality of comparable external dependencies for each of the identified referenced external dependencies, the comparable external dependencies provided by external frameworks on the internet; and
retrieve an external dependent metadata file for each of the plurality of located comparable external dependencies, the external dependent metadata file including metadata associated with the comparable external dependencies;

comparing the metadata of each comparable external dependent metadata file to the metadata of the application metadata file;

assigning, based on the comparison, a confidence level for each comparable external dependency, the confidence level being relative to a pre-determined confidence level, the assigning further comprising, assigning a greater confidence level to one of the located comparable external dependencies having a smallest file size relative to the other located comparable external dependencies;

downloading the located comparable external dependencies for each referenced external dependency having a confidence level greater than the pre-determined confidence level; and combining and compiling the application source code with the internal dependencies and the downloaded external dependencies.

8. The method of claim 7 wherein, for each referenced external dependency in the application metadata file and for each of the external dependent metadata files, the metadata includes:
a file name;
a file size; and
a file version.

9. The method of claim 7 wherein the comparing of the metadata further comprises, comparing a file name, file size and file version of the referenced external dependencies to a file name, file size and file version of the external dependent metadata files for determining the confidence level.

10. The method of claim 7 wherein, when there are a plurality of comparable external dependencies being assigned a confidence level greater than the pre-determined confidence level, the machine learning tool is further configured to:
prompt a user to select a comparable external dependency from the plurality of comparable external dependencies having a confidence level greater than the pre-determined confidence level;
assign the user-selected comparable external dependency a highest level of confidence;
store, in a database on the centralized server, the user-selected comparable external dependency and its associated external dependent metadata file; and
download the user-selected comparable external dependency.

11. The method of claim 7 wherein, when the application source code for an application is being compiled again for the user, the system further comprises automatically retrieving a stored user-selected comparable external dependency.

12. The method of claim 7 wherein, the application referenced external dependencies further include open-source software libraries, software objects and software classes.

13. A method for compiling an application, the method comprising:
retrieving from a centralized server:
an application source code associated with the application, the application source code referencing:
a plurality of internal dependencies stored in a cloud, the cloud in synchronization with the centralized server; and
a plurality of external dependencies for compiling the application;
an application metadata file including metadata associated with each of the pluralities of external dependencies; and performing a plurality of machine learning steps using a machine learning tool, the plurality of steps comprising:
identifying the external dependencies referenced in the application;
instructing a web-crawler, the web-crawler being a component of the machine learning tool, to:
locate a plurality of comparable external dependencies for each of the identified referenced external dependencies, the comparable external dependencies provided by external frameworks on the internet; and
retrieve an external dependent metadata file for each of the plurality of located comparable external dependencies, the external dependent metadata file including metadata associated with the comparable external dependencies;
comparing the metadata of each comparable external dependent metadata file to the metadata of the application metadata file;
assigning, based on the comparison, a confidence level for each comparable external dependency, the confidence level being relative to a pre-determined confidence level, the assigning further comprising, assigning a greater confidence level to one of the located comparable external dependencies having a latest version relative to the other located comparable external dependencies;
downloading the located comparable external dependencies for each referenced external dependency having a confidence level greater than the pre-determined confidence level; and
combining and compiling the application source code with the internal dependencies and the downloaded external dependencies.

14. The method of claim 13 wherein, for each referenced external dependency in the application metadata file and for each of the external dependent metadata files, the metadata includes:
a file name;
a file size; and
a file version.

15. The method of claim 13 wherein the comparing of the metadata further comprises, comparing a file name, file size and file version of the referenced external dependencies to a file name, file size and file version of the external dependent metadata files for determining the confidence level.

16. The method of claim 13 wherein, when there are a plurality of comparable external dependencies being assigned a confidence level greater than the pre-determined confidence level, the machine learning tool is further configured to:
prompt a user to select a comparable external dependency from the plurality of comparable external dependencies having a confidence level greater than the pre-determined confidence level;
assign the user-selected comparable external dependency a highest level of confidence;
store, in a database on the centralized server, the user-selected comparable external dependency and its associated external dependent metadata file; and
download the user-selected comparable external dependency.

17. The method of claim 13 wherein, when the application source code for an application is being compiled again for the user, the system further comprises automatically retrieving a stored user-selected comparable external dependency.

18. The method of claim 13 wherein, the application referenced external dependencies further include open-source software libraries, software objects and software classes.

\* \* \* \* \*

UNITED STATES PATENT AND TRADEMARK OFFICE
CERTIFICATE OF CORRECTION

PATENT NO. : 10,459,701 B2  
APPLICATION NO. : 16/430715  
DATED : October 29, 2019  
INVENTOR(S) : Awadhesh Prataph Singh and Dinesh Narendra Jibhe Page 1 of 1

It is certified that error appears in the above-identified patent and that said Letters Patent is hereby corrected as shown below:

In the Claims

Column 8, Line 2 delete "B"

Column 8, Line 8 delete "B"

Signed and Sealed this
Sixth Day of October, 2020

Andrei Iancu
*Director of the United States Patent and Trademark Office*